March 11, 1947.   E. J. COURTNEY   2,417,239
SPINNING ROLL FOR SPINNING AND DRAWING FRAMES
Filed April 4, 1946
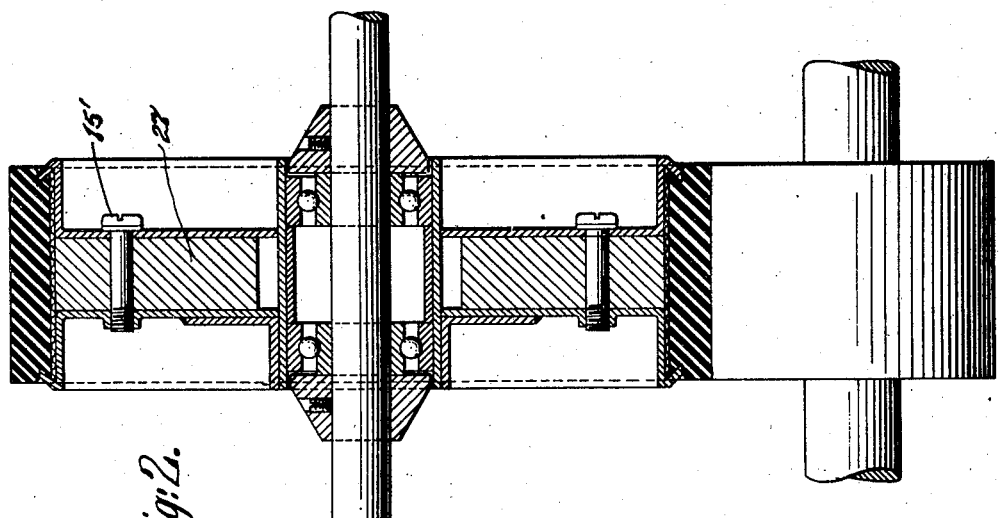
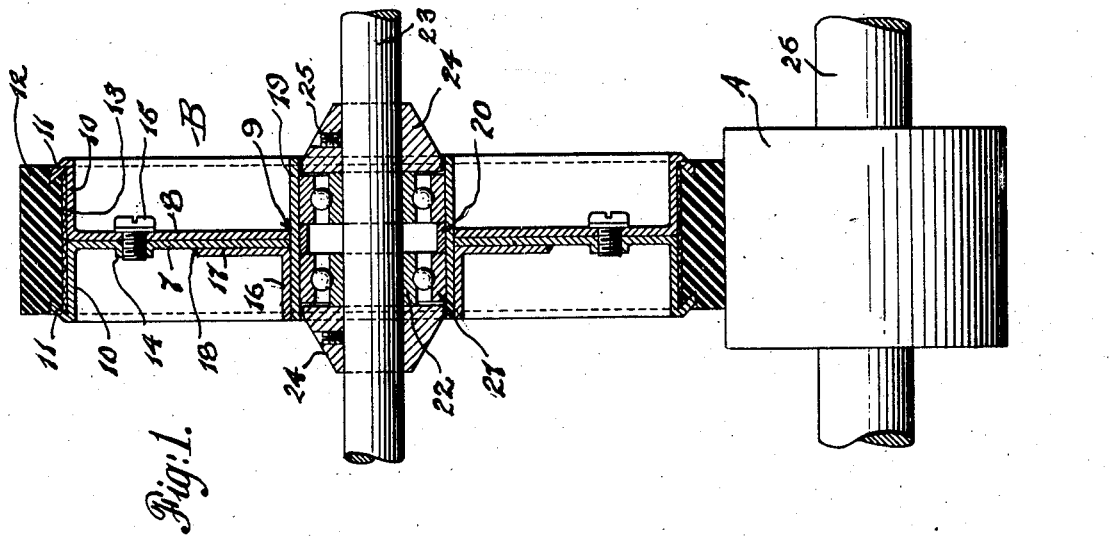
INVENTOR
Edward J. Courtney
BY
ATTORNEYS Patented Mar. 11, 1947

2,417,239

UNITED STATES PATENT OFFICE 2,417,239

SPINNING ROLL FOR SPINNING AND DRAWING FRAMES

Edward J. Courtney, Oaklyn, N. J.

Application April 4, 1946, Serial No. 659,489

5 Claims. (Cl. 19—142)

This invention relates to rolls for spinning and drawing frames and the like, and the primary object of the invention is to provide a roll of composite construction which is very simple, easy to make, inexpensive and very light, whereby, inter alia, the horsepower consumption is greatly reduced as compared with the conventional rolls now universally used in such frames.

How the foregoing, together with such other objects and advantages as may hereinafter appear, or are incident to the invention, are realized is illustrated in the accompanying drawings, wherein—

Figure 1 illustrates my improved form of roll in cross section, as associated with a drawing roll.

Figure 2 is a similar view showing how the roll may be readily adapted for use "as is," in a variety of widths, the only change being the provision of appropriate fastening means.

Referring now to Figure 1, the reference character A indicates a conventional drawing roll, and the reference character B indicates my improved idler roll to be used in association with such drawing roll.

The roll B is composed of two complementary, stamped sheet-metal disks 7 and 8 which are adapted to be arranged back to back. Each disk has a central opening or aperture 9, the apertures preferably registering with one another. Each disk has its outer end portion bent into a peripheral flange 10, extending normally to the body of the disk. Each flange 10 has its edge or rim portion bent generally radially outwardly, as indicated at 11, the bent rim portions 11 inclining slightly toward one another. The flanges 10 provide a seat for an annular cover 12, preferably composed of rubber or similar material and provided with an inner facing 13 of canvas or the like. When the disks are assembled back to back, the cover 12 is clamped between the rim portions 11, the latter biting into the end faces of the cover, as will further appear, thereby preventing rotation of the cover with respect to the wheel. The canvas 13 tends to prevent the cover from stretching. In the first instance, the disks are stamped in counterpart form. Then one of the disks is extruded at suitable points to provide a thickened portion 14 to receive the screws 15 or other means employed for securing the disks in back to back relation.

Attached to one of the disks, preferably the one having the enlarged portions 14, is a stamped collar 16 having an annular flange 17. The collar 16 is normal to its disk and the flange is parallel thereto. The flange 17 is secured to the disk as, for example, by welding, indicated at 18.

The fitting within the collar and the two disks, is an elongated sleeve 19 which extends to either side, substantially beyond the faces of the disks. The sleeve is secured as, for example, by spot welding to the collar or other adjacent part exterior to the sleeve.

Located centrally within the sleeve is a stop ring 20 which is secured, as by spot welding, to the sleeve. To either side of the ring 20 is a ball bearing the outer race 21 of which fits snugly within the sleeve 19, preferably by a press fit. The inner race 22 of each ball bearing receives a shaft 23.

The roll is positioned on the shaft 23 by means of the collars 24 which, it will be observed, are adapted to bear against the inner races or non-rotative portion of the bearing, while clearing the outer races which rotate. The collars are positioned by means of the set screws 25.

If desired, the inner edge portions of the rims 11 may be knurled or otherwise roughened to secure a firm grip on the cover.

In the arrangement shown in Figure 1, shaft 23 is driven and is provided with a plurality of the drawing rolls A, keyed or otherwise secured to rotate therewith. In many frames there are four or more of these drawing rolls A. The shaft 23, however, is preferably of a length to carry only two of the idler rolls B. There will, of course, be a number of the shafts 23 for a frame, each carrying a pair of the idler rolls B. These shafts are supported in conventional manner for ready removal.

It will be seen from the foregoing that the construction of the roll is very simple, inexpensive and light. Heretofore it has been customary to use heavy cast rolls, keyed to the shafts 23, in consequence of which, among other things, the power consumption has been heavy and an optimum quality of yarn is not obtained. By my construction, the power requirements are very substantially reduced and the quality of the yarn improved. Moreover, it will be seen that either of the rolls on shaft 23 may be removed over an end of the shaft by removing the corresponding collar 24, without disturbing the other collar, so that when the roll is returned, after recovering, it will be positioned exactly as before, which is of importance. Also it will be observed that the wheel comes off as a whole.

In Figure 1 the cover 12 is relatively narrow. When wider covers are employed, then a spacer member or members 27 are provided, as shown in Figure 2, and screws 15' of adequate length are substituted for the screws 15. It is of considerable advantage, both from the standpoint of simplicity and of cost, that all of the disks in the first instance are of counterpart construction.

I claim:

1. A spinning roll for spinning and drawing frames and the like comprising a pair of complementary stamped sheet-metal disks arranged reversely to one another and having central registering apertures and each being provided with a peripheral annular flange normal to the body of the disk, the flanges cooperating to provide a seat for a cover, one of said disks being provided with a stamped sheet metal flanged collar, the collar portion being normal to the body of the disk and the flange thereof being fastened to the said disk, an elongated sleeve fitting within said collar and extending to either side substantially beyond the faces of the pair of disks, bearing means within the sleeve having a non-rotative shaft receiving portion, a shaft fitting within said portion of the bearing means, releasable positioning means on the shaft adapted to bear against the non-rotative portion of the bearing means, means for securing the disks in back to back relation, and an annular cover carried by the flanges of the disks.

2. A spinning roll for spinning and drawing frames and the like comprising a pair of complementary stamped sheet metal disks arranged reversely to one another and having central registering apertures and each being provided with a peripheral annular flange normal to the body of the disk, each flange having edge portions bent generally radially outwardly, the flanges cooperating to provide a seat for a cover and the outwardly bent portions being adapted to clamp the cover therebetween, at least one of said disks being provided with a stamped sheet metal flanged collar, the collar portion being normal to the body of the disk and the flange thereof being fastened to the disk, an elongated sleeve fitting within said collar and extending to either side substantially beyond the faces of the pairs of disks, bearing means within the sleeve having a non-rotative shaft receiving portion, a shaft fitting within said portion of the bearing means, releasable positioning means on the shaft adapted to bear against the non-rotative portion of the bearing means, an annular cover carried by the flanges of the disks, and means for securing the disks together to clamp said cover between said outwardly bent portions.

3. A spinning roll for spinning and drawing frames and the like comprising a pair of complementary stamped sheet metal disks arranged reversely to one another and having central registering apertures and each being provided with a peripheral annular flange normal to the body of the disk, each flange having edge portions bent generally radially outwardly, the flanges cooperating to provide a seat for a cover and the outwardly bent portions being adapted to clamp the cover therebetween, at least one of said disks being provided with a stamped sheet metal flanged collar, the collar portion being normal to the body of the disk and the flange thereof being fastened to the disk, an elongated sleeve fitting within said collar and extending to either side substantially beyond the faces of the pairs of disks, bearing means within the sleeve having a non-rotative shaft receiving portion, a shaft fitting within said portion of the bearing means, releasable positioning means on the shaft adapted to bear against the non-rotative portion of the bearing means, an annular cover carried by the flanges of the disks, and means for securing the disks to clamp said cover between said outwardly turned portions, said outwardly turned portions also inclining toward one another so as to bite into the cover.

4. A spinning roll for spinning and drawing frames and the like comprising a pair of complementary stamped sheet-metal disks arranged reversely to one another and having central registering apertures and each being provided with a peripheral annular flange normal to the body of the disk, the flanges cooperating to provide a seat for a cover, one of said disks being provided with a stamped metal flanged collar, the collar portion being normal to the body of the disk and the flange thereof being fastened to the said disk, an elongated sleeve fitting within said collar and extending to either side substantially beyond the faces of the pair of disks, bearing means within the sleeve having a non-rotative shaft receiving portion, a shaft fitting within said portion of the bearing means, releasable positioning means on the shaft adapted to bear against the non-rotative portion of the bearing means, means for securing the disks in back to back relation, and an annular cover carried by the flanges of the disks, the flange of the collar being welded to its disk and the sleeve being welded to an adjacent part exterior thereto.

5. A spinning roll for spinning and drawing frames and the like comprising a pair of complementary stamped sheet-metal disks arranged reversely to one another and having central registering apertures and each being provided with a peripheral annular flange normal to the body of the disk, the flanges cooperating to provide a seat for a cover, one of said disks being provided with a stamped sheet metal flanged collar, the collar portion being normal to the body of the disk and the flange thereof being fastened to the said disk, an elongated sleeve fitting within said collar and extending to either side substantially beyond the faces of the pair of disks, ball bearing means within the sleeve, the outer race portion of which engages the inside of the sleeve and the inner race portion of which is adapted to receive a shaft, a shaft fitting within the inner race portion, releasable positioning means on the shaft engaging the inner race portion, and an annular cover carried by the flanges of the disk.

EDWARD J. COURTNEY.